United States Patent
Pettit et al.

(10) Patent No.: US 11,872,909 B2
(45) Date of Patent: Jan. 16, 2024

(54) METHOD AND APPARATUS FOR MONITORING A FUEL CELL

(71) Applicant: GM GLOBAL TECHNOLOGY OPERATIONS LLC, Detroit, MI (US)

(72) Inventors: William H. Pettit, Rochester, NY (US); Charles E. Freese, V, Ira Township, MI (US); Balasubramanian Lakshmanan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 161 days.

(21) Appl. No.: 17/388,675

(22) Filed: Jul. 29, 2021

(65) Prior Publication Data

US 2023/0045299 A1 Feb. 9, 2023

(51) Int. Cl.
*B60L 58/40* (2019.01)
*H01M 8/04858* (2016.01)
*B60L 58/32* (2019.01)

(52) U.S. Cl.
CPC ............. *B60L 58/40* (2019.02); *B60L 58/32* (2019.02); *H01M 8/04947* (2013.01); *B60L 2240/423* (2013.01); *H01M 2250/20* (2013.01)

(58) Field of Classification Search
CPC .......... B60L 58/40; B60L 58/32; B60L 15/20; B60L 2240/423; H01M 8/04947; H01M 2250/20
See application file for complete search history.

(56) References Cited

U.S. PATENT DOCUMENTS

| | | | | |
|---|---|---|---|---|
| 2014/0072893 A1* | 3/2014 | Moses | ............... | H01M 8/04753 429/432 |
| 2017/0305297 A1* | 10/2017 | Kim | .................... | H01M 8/0488 |
| 2018/0145350 A1* | 5/2018 | Matsumoto | ....... | H01M 8/04634 |

* cited by examiner

*Primary Examiner* — Adam A Arciero
(74) *Attorney, Agent, or Firm* — Quinn IP Law

(57) ABSTRACT

A torque generating system is described, and includes a fuel cell power device, a high-voltage battery, an electric drive unit, and a controller. The fuel cell power device has a non-linear power-temperature relationship that has a local temperature maxima at a first electric power level and a local temperature minima at a second electric power level. A first operating point of the fuel cell power device is less than the first electric power level, and a second operating point of the fuel cell power device is set at a third electric power level that is greater than the first electric power level, wherein the third electric power level generates a fuel cell temperature that is less than the local temperature maxima. The fuel cell power device is controlled to one of the first operating point or the second operating point to transfer electric power to the electric drive unit.

18 Claims, 6 Drawing Sheets

METHOD AND APPARATUS FOR MONITORING A FUEL CELL

A fuel cell is an electro-chemical device that converts chemical energy of a fuel, e.g., hydrogen, into electrical power by an electro-chemical reaction. Multiple fuel cells may be combined to form a fuel cell stack to generate a desired fuel cell power output. One type of fuel cell includes a polymer electrolyte membrane fuel cell (PEMFC). The electric power generated by a fuel cell stack may be used to power an electric machine, such as an on-vehicle traction motor or a stationary generator.

Operating temperature of a fuel cell stack may negatively correlate to durability and service life, with a higher average operating temperature over time having the potential of decreasing the service life of the fuel cell stack. Other factors that may affect service life of a fuel cell stack may include voltage cycles, peak voltages, presence of fuel contaminants, etc.

Design, material selection, and integration of fuel cell stacks is intended to optimize trade-offs affecting performance, durability, and robustness to achieve electric power targets. There is a need for operation of a fuel cell stack that achieves electric power targets while improving the performance, service life, and robustness thereof.

SUMMARY

A torque generating system is described, and includes one or multiple fuel cell power devices, one or multiple high-voltage batteries, one or multiple electric drive units, and a controller. The controller is in communication with the one or multiple fuel cell power devices, the one or multiple high-voltage batteries, and the one or multiple electric drive units to monitor and control operation of the torque generating device to achieve a target torque output that is responsive to a power request.

In one embodiment, the torque generating system includes a fuel cell power device, a high-voltage battery, an electric drive unit, and a controller. The fuel cell power device and the high-voltage battery are electrically connected to a high-voltage bus, and electric power is supplied to the electric drive unit via the high-voltage bus. The fuel cell power device has a non-linear power-temperature relationship that has a local temperature maxima at a first electric power level and a local temperature minima at a second electric power level. A first operating point of the fuel cell power device is less than the first electric power level, and a second operating point of the fuel cell power device is set at a third electric power level that is greater than the first electric power level, wherein the third electric power level generates a fuel cell temperature that is less than the local temperature maxima. The fuel cell power device is controlled to one of the first operating point or the second operating point to transfer electric power to the electric drive unit, and the high-voltage battery and the fuel cell power device cooperate to transfer electric power to the electric drive unit to generate mechanical torque that is responsive to a power request.

An aspect of the disclosure includes the second operating point of the fuel cell power device corresponding to the second electric power level that is associated with the local temperature minima.

Another aspect of the disclosure includes the electric drive unit being an electric machine that is coupled to a vehicle driveline, wherein the high-voltage battery and the fuel cell power device cooperate to transfer electric power to the electric machine to generate tractive torque that is responsive to a power request.

Another aspect of the disclosure includes the high-voltage battery and the fuel cell power device cooperating to transfer electric power to the electric machine to generate positive tractive torque that is responsive to a power request that includes vehicle acceleration.

Another aspect of the disclosure includes the high-voltage battery and the fuel cell power device cooperating to react torque to generate electric power through the electric machine to generate negative tractive torque that is responsive to a power request that includes vehicle braking.

Another aspect of the disclosure includes the electric drive unit being an electric machine that is coupled to a stationary electric motor, wherein the high-voltage battery and the fuel cell power device cooperate to transfer electric power to the electric machine to generate mechanical torque that is responsive to the power request.

Another aspect of the disclosure includes the fuel cell power device being controlled to cyclically alternate between the first operating point and the second operating point to transfer electric power to the electric drive unit of the torque generating system to generate mechanical torque that is responsive to the power request.

Another aspect of the disclosure includes the fuel cell power device being controlled to alternate between the first operating point and the second operating point at a frequency and a duty cycle that is responsive to the power request.

Another aspect of the disclosure includes the fuel cell power device being cyclically controlled between the first operating point and the second operating point to achieve an average power over time that achieves an average operating temperature of the fuel cell power device that is less than a target operating temperature.

Another aspect of the disclosure includes the fuel cell power device being controlled to transfer electric power to charge the high-voltage electric battery.

Another aspect of the disclosure includes a torque generating system that includes a first fuel cell power device, a second fuel cell power device, a high-voltage battery, an electric drive unit, and a controller, wherein the first and second fuel cell power devices and the high-voltage battery are electrically connected to a high-voltage bus, and wherein electric power is supplied to the electric drive unit via the high-voltage bus. Each of the first and second fuel cell power devices has a non-linear power-temperature relationship that has a local temperature maxima at a first electric power level and a local temperature minima at a second electric power level, wherein a first operating point of each of the first and second fuel cell power devices is less than the first electric power level, wherein a second operating point of each of the fuel cell power devices is set at a third electric power level that is greater than the first electric power level, and wherein the third electric power level corresponds to operation of the fuel cell power device that generates a fuel cell temperature that is less than the local temperature maxima. The first fuel cell power device is controlled to one of the first operating point or the second operating point to transfer electric power to the electric drive unit. The second fuel cell power device is controlled to one of the first operating point or the second operating point to transfer electric power to the electric drive unit. The high-voltage battery and the first and second fuel cell power devices cooperate to transfer electric power to the electric drive unit to generate mechanical torque that is responsive to a power request.

Another aspect of the disclosure includes the first fuel cell power device being controlled to the second operating point coincident with the second fuel cell power device being controlled to the first operating point to transfer electric power to the electric drive unit.

Another aspect of the disclosure includes the first fuel cell power device being controlled to one of the first operating point or the second operating point, and the second fuel cell power device being deactivated.

Another aspect of the disclosure includes the first and second fuel cell power devices being controlled to cyclically alternate between the first operating point and the second operating point to transfer electric power to the electric drive unit of the torque generating system to generate mechanical torque that is responsive to the power request.

Another aspect of the disclosure includes the first fuel cell power device being controlled to alternate between the first operating point and the second operating point at a first frequency and a first duty cycle, and the second fuel cell power device being controlled to alternate between the first operating point and the second operating point at a second frequency and a second duty cycle.

Another aspect of the disclosure includes the first frequency being equal to the second frequency; and a phase difference between the first frequency and the second frequency being 180 degrees.

Another aspect of the disclosure includes the first frequency being equal to the second frequency, wherein the first frequency and the second frequency are in phase.

Another aspect of the disclosure includes the first frequency being different from the second frequency.

Another aspect of the disclosure includes a method for controlling a fuel cell power device, wherein the fuel cell power device is electrically coupled to a torque generating system. The method includes determining a non-linear power-temperature relationship for the fuel cell power device, including determining a local temperature maxima at a first electric power level and determining a local temperature minima at a second electric power level. A first operating point of the fuel cell power device is determined that is less than the first electric power level, and a second operating point of the fuel cell power device is set at a third electric power level that is greater than the first electric power level. The third electric power level generates a fuel cell temperature that is less than the local temperature maxima. The fuel cell power device is controlled to alternate between the first operating point and the second operating point to transfer electric power to an electric drive unit of the torque generating system to generate mechanical torque.

Another aspect of the disclosure includes determining a power request for the torque generating system, determining a magnitude of battery power being transferred between the torque generating system and a high-voltage battery and controlling the fuel cell power device to cyclically alternate between the first operating point and the second operating point to transfer electric power to the electric drive unit of the torque generating system. The magnitude of battery power being transferred between the torque generating system and the high-voltage battery is controlled based upon an average electric power transferred to the electric drive unit of the torque generating system from the fuel cell power device and in response to the power request.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

Figure 1:
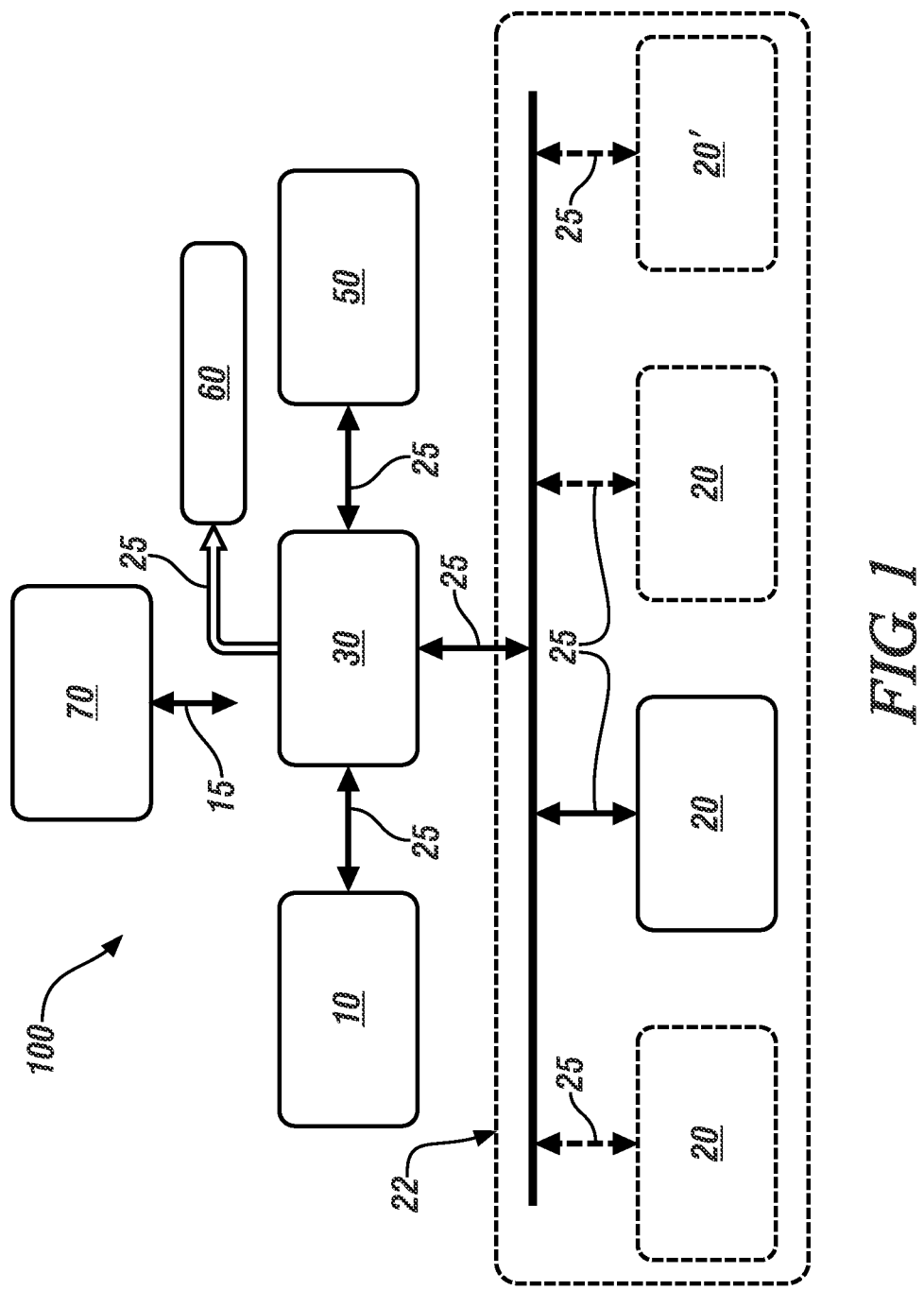
FIG. 1 schematically illustrates elements of an architecture for a torque generating system that includes a fuel cell power device, a high-voltage battery and electric drive unit, and an associated controller, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

The following detailed description is exemplary in nature and is not intended to limit the application and uses. Furthermore, there is no intent to be bound by any expressed or implied theory presented herein. Throughout the drawings, corresponding reference numerals indicate like or corresponding parts and features. As used herein, the term "system" refers to combinations or collections of mechanical and electrical hardware, software, firmware, electronic control component, processing logic, and/or processor device, individually or in combination, including without limitation: application specific integrated circuit (ASIC), an electronic circuit, a processor (shared, dedicated, or group) that executes one or more software or firmware programs, memory to contain software or firmware instructions, a combinational logic circuit, and/or other suitable components that provide the described functionality.

FIG. 1, consistent with embodiments disclosed herein, schematically illustrates elements of an architecture for a torque generating system 100 that includes a single one or an array 22 of fuel cell power device(s) 20, a high-voltage battery 10, an electric drive unit 50, an auxiliary power unit 60, and a controller 70. The torque generating system 100 is controllable to generate mechanical torque in response to a power request, wherein the power request may include, by way of non-limiting examples, an output torque request, an operator torque request, etc. The fuel cell power device(s) 20 and the high-voltage battery 10 are electrically connected to a high-voltage electric power distribution system 30 via a high-voltage bus 25 to supply electric power to the electric drive unit 50. The fuel cell power device(s) 20 and the high-voltage battery 10 may be employed as DC electric power sources for the electric drive unit 50. In one embodiment, the electric drive unit 50 may be an electric machine that may be employed on a mobile platform, i.e., a vehicle to provide tractive power, and may be in the form of a commercial vehicle, industrial vehicle, agricultural vehicle, passenger vehicle, aircraft, watercraft, rail-train, all-terrain vehicle, personal movement apparatus, robot and the like to accomplish the purposes of this disclosure. Alternatively, the electric drive unit 50 may be disposed on a non-vehicular application, such as for stationary power generation, portable power generation, electronics, a remote weather station operation, a communication center, etc. The single fuel cell power device 20 is indicated by solid lines, and the array 22 of the fuel cell power devices 20 is indicated by dashed lines. One of the fuel cell power devices is designated by numeral 20', indicating that it is has a configuration that differs from the fuel cell power device 20 and/or has a performance characterization that differs from the fuel cell power device(s) 20. Details related to performance characterizations of the fuel cell power device(s) 20 and 20' are discussed with reference to FIGS. 2A, 2B, and 2C. The concepts described herein are not restricted to a specific quantity of the fuel cell power device(s) 20 that may be employed. Instead, the quantity of the fuel cell power device(s) 20 is determined based upon system-specific needs, including, e.g., two, three, four, or more of the fuel cell power device(s) 20. By way of a non-limiting example, as many as twenty or more of the fuel cell power devices 20 may be employed in some embodiments, such as on a train locomotive.

In one embodiment, the fuel cell power device(s) 20 and the high-voltage battery 10 cooperate to supply electric power to the electric drive unit 50, with the controller 70 operating the torque generating system 100 with the high-voltage battery 10 in a charge-depletion mode over the course of a trip, such as when the torque generating system 100 is employed on-vehicle and employing route planning and navigation routines, such as user pattern learning, driver mode input, navigation route input, etc. In one embodiment, the fuel cell power device(s) 20 and the high-voltage battery 10 cooperate to supply electric power to the electric drive unit 50, with the controller 70 operating the torque generating system 100 with the high-voltage battery 10 in a charge-sustaining mode over the course of a trip when the torque generating system 100 is employed on-vehicle.

In one embodiment, the fuel cell power device(s) 20 and the high-voltage battery 10 cooperate to supply electric power to the electric drive unit 50 in conjunction with an internal combustion engine being employed to generate tractive torque that is transferred to a vehicle driveline and/or to generate torque that is transformed to electric power for use by the electric drive unit 50 and/or for storage in the high-voltage battery 10.

The electric drive unit 50 includes, in one embodiment, a rotary electric machine that serves as an electric traction motor for a system having an at least partially-electric drivetrain, and is coupled to a drive wheel via a driveline. Non-limiting examples of the rotary electric machine may include a permanent magnet direct current motor, an alternating current motor, a direct current generator, an alternating current generator, an eddy current clutch, an eddy current brake, a rotary converter, a hysteresis dynamometer, a transformer, and the like. Motor torque generated by the rotary electric machine may be used to propel a vehicle, start an internal combustion engine (on systems so equipped), and/or perform other electro-mechanical functions. The rotary electric machine may also be controlled to react torque and thus generate electric power, such as for regenerative braking. The electric drive unit 50 may include a single electric machine that connects via a driveline to a vehicle wheel when employed on-vehicle. Alternatively, the electric drive unit 50 may include multiple electric machines that connect via one or multiple driveline devices to multiple vehicle wheels.

Each fuel cell power device 20 includes a plurality of polymer electrolyte membrane fuel cell (PEMFC) in one embodiment, and includes a cathode, an anode, and an electrolyte. An anode system may include a single injector system or a multi-injector system that fluidly couples to the anode and is arranged to controllably supply pressurized hydrogen to an inlet of the anode from a hydrogen tank. Each fuel cell power device 20 may also include an air supply system that includes an air inlet and an exhaust outlet and is arranged to supply and control airflow to the cathode. The electrolyte, e.g., a polymer electrolyte membrane, is disposed between the cathode and the anode. Further, the fuel cell power device 20 may be formed from one or more membrane electrode assemblies (MEA) that include the cathode, anode, a plurality of flow plates, a catalyst, and a plurality of gas diffusion layers.

During operation of the fuel cell power device 20, chemical energy from an electro-chemical reaction of hydrogen ($H_2$) and oxygen ($O_2$) may transform to electrical energy. In particular, hydrogen gas ($H_2$) may enter the anode and be catalytically split into protons (W) and electrons (e) at the catalyst. The protons (W) may permeate through the electrolyte to the cathode, while the electrons (e) may not permeate the electrolyte but may instead travel along an external load circuit to the cathode to produce a fuel cell power output or electrical current. Concurrently, air, e.g., oxygen ($O_2$) and nitrogen ($N_2$), may enter the cathode, react with the protons (W) permeating through the electrolyte and the electrons (e) arriving to the cathode from the electric drive unit 50, and form a byproduct such as water ($H_2O$) and heat. The heat may be expelled through the exhaust of the fuel cell and/or a cooling fluid. The water ($H_2O$) may travel through the electrolyte to the anode and may be collected in a sump. Each fuel cell power device(s) 20 exhibits a non-linear power-temperature relationship, which is described with reference to FIG. 2.

Figure 3:
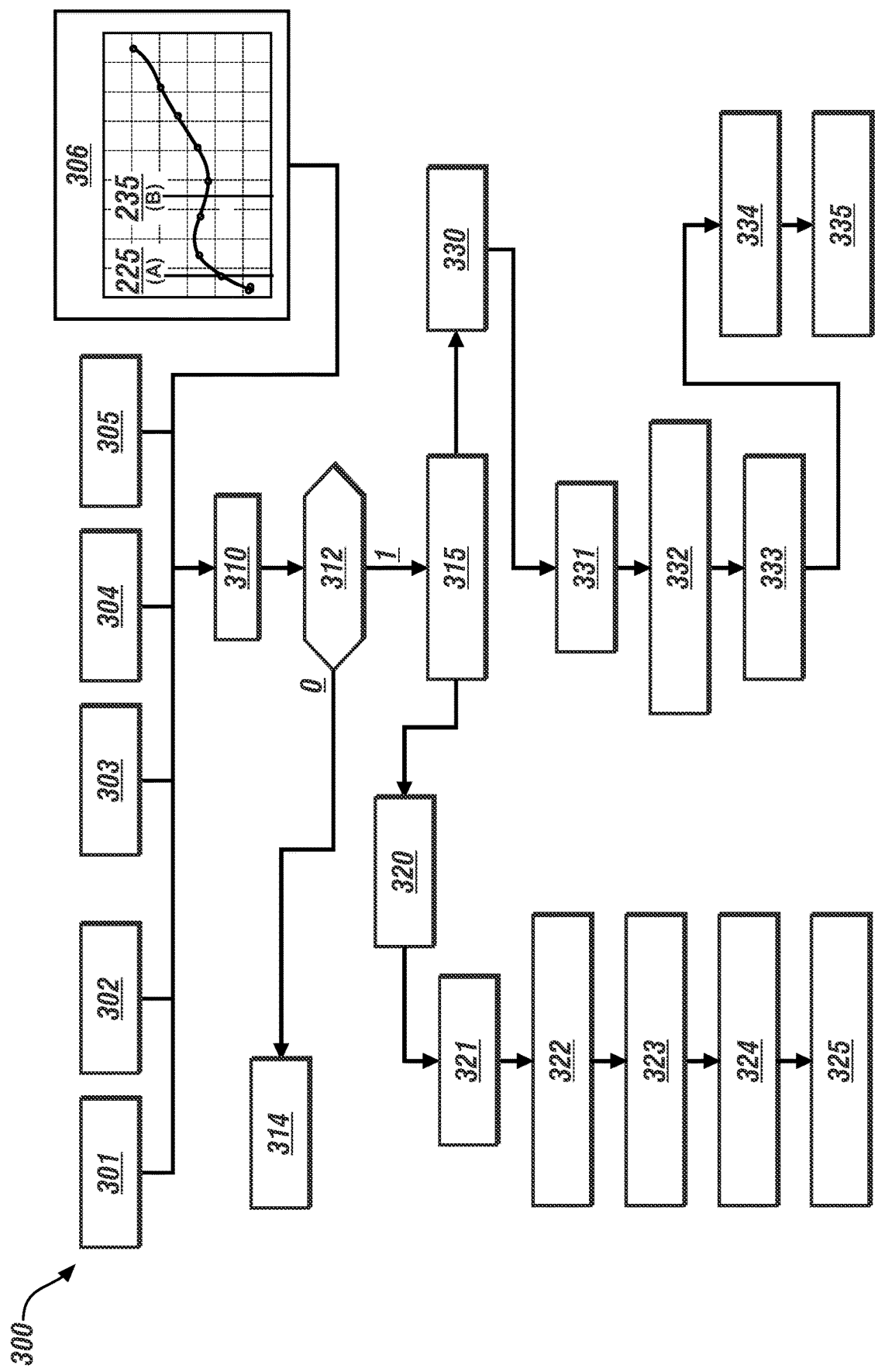
FIG. 3 schematically illustrates, in flowchart form, a fuel cell temperature management routine for monitoring and controlling operation(s) of one or multiple fuel cell power device(s) that are employed in an embodiment of a torque generating system, in accordance with the disclosure.

The controller 70 includes an executable control routine 300 for operating the torque generating system 100, and is described herein with reference to FIG. 3.

The torque generating system 100 includes the high-voltage battery 10 and a single fuel cell power device 20 in one embodiment. Alternatively, the torque generating system 100 includes the high-voltage battery 10, the fuel cell power device 20, and a second of the fuel cell power devices 20 in one embodiment. This arrangement may include, in one embodiment, one or more fuel cell power devices 20'. Alternatively, the torque generating system 100 includes the high-voltage battery 10 and the array 22 of the fuel cell power devices 20' in one embodiment.

Figure 2A:
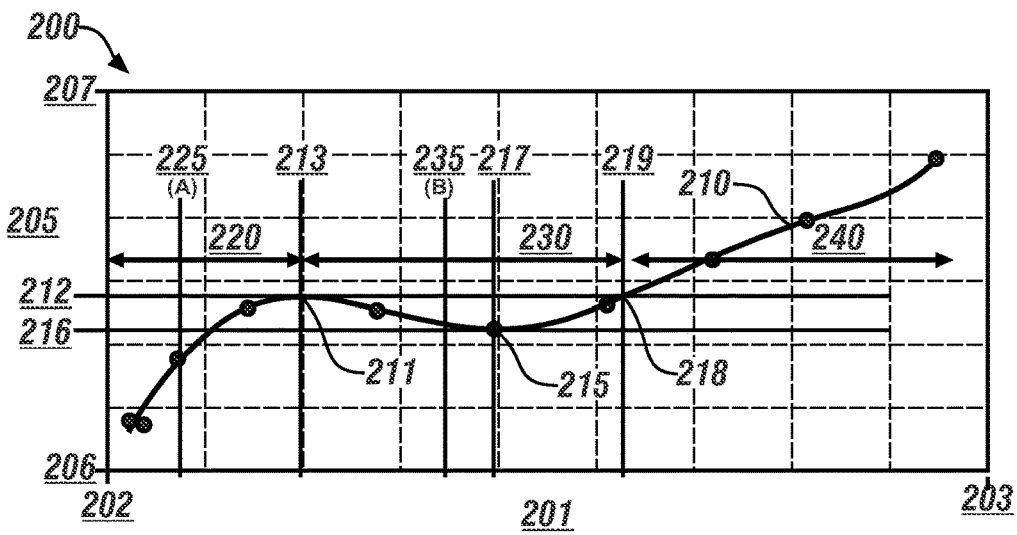
FIG. 2A graphically illustrates an embodiment of non-linear power-temperature relationship for an embodiment of a fuel cell power device that has a local temperature maxima at a first electric power level and a local temperature minima at a second electric power level, in accordance with the disclosure.

FIG. 2A graphically illustrates a performance characterization 200 for an embodiment of the fuel cell power device 20 that is described with reference to FIG. 1. The performance characterization 200 may be described in relation to electric power 201 on the horizontal axis and a temperature 205 of the fuel cell power device 20 on the vertical axis, with a non-linear power-temperature relationship 210 being illustrated. The non-linear power-temperature relationship 210 for the fuel cell power device 20 may occur as a result of system optimization, material selection, design trade-offs, etc. during product development that affect performance, durability, and robustness to achieve electric power targets.

The electric power 201 may be a quantitative measure of net electric power output from the fuel cell power device 20, and ranges between a minimum or zero power output 202 and a maximum power output 203. The maximum power output 203 indicates the maximum power output that the fuel cell power device 20 is capable of producing. The temperature 205 of the fuel cell power device 20 is a quantitative measure of a temperature associated with operation of the fuel cell power device 20, such as a coolant inlet temperature or another parameter. The temperature 205 ranges between a low temperature 206, e.g., ambient temperature, and a maximum temperature 207, such as may occur when the fuel cell power device 20 is operating at maximum power output.

The non-linear power-temperature relationship 210 includes a first inflection point 211 that occurs at a local temperature maxima 212, and has an associated first electric power level 213. The non-linear power-temperature relationship 210 also includes a second inflection point 215 that occurs at a local temperature minima 216, and has an associated second electric power level 217.

The non-linear power-temperature relationship 210 also includes a third operating point 218 and associated third electric power level 219, which occurs at a point on the non-linear power-temperature relationship 210 at a power level that is greater than the second electric power level 217 wherein the temperature is equal to the local temperature maxima 212.

The non-linear power-temperature relationship 210 may be separated into a first operating region 220, a second operating region 230, and a third operating region 240. The first operating region 220 is defined as a region of the non-linear power-temperature relationship 210 between a zero power output and the first electric power level 213. The second operating region 230 is defined as a region of the non-linear power-temperature relationship 210 between the first electric power level 213 and the third electric power level 219. The third operating region 240 is defined as a region of the non-linear power-temperature relationship 210 wherein the power output is greater than the third electric power level 219. A first operating point 225 (A) is indicated, and represents a power level that is within the first operating region 220, i.e., less than the first electric power level 213 of the fuel cell power device 20. A second operating point 235 (B) is also indicated, and represents a power level that is within the second operating region 230, i.e., greater than the first electric power level 213 and less than the third electric power level 219.

Figure 2B:
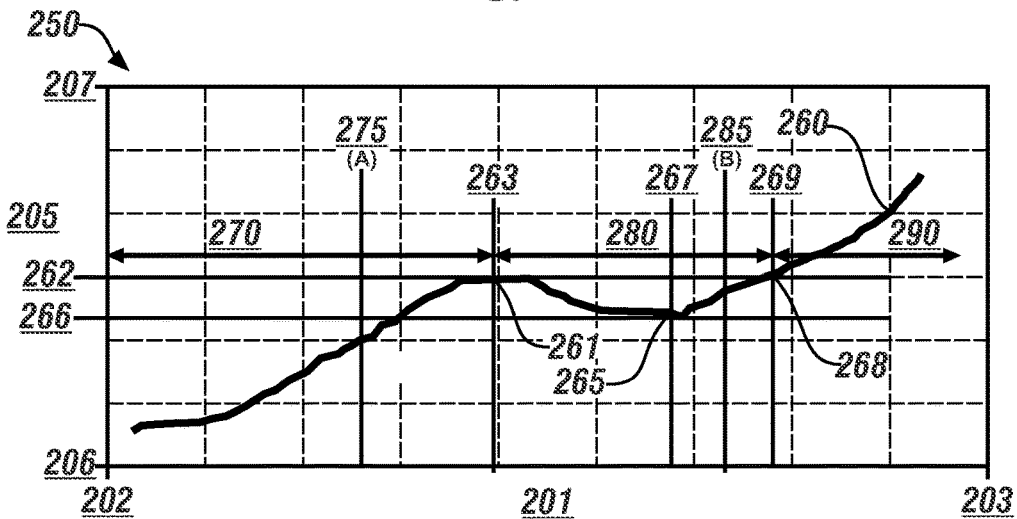
FIG. 2B graphically illustrates another embodiment of a non-linear power-temperature relationship for an embodiment of a fuel cell power device that has a local temperature maxima at a first electric power level and a local temperature minima at a second electric power level, in accordance with the disclosure.

FIG. 2B graphically illustrates a performance characterization 250 for an embodiment of the fuel cell power device 20' that is described with reference to FIG. 1. The performance characterization 250 may be described in relation to electric power 201 on the horizontal axis and a temperature 205 of the fuel cell power device 20' on the vertical axis, with a non-linear power-temperature relationship 260 being illustrated. The non-linear power-temperature relationship 260 for the fuel cell power device 20' may occur as a result of system optimization, material selection, design trade-offs, etc. during product development that affect performance, durability, and robustness to achieve electric power targets.

The non-linear power-temperature relationship 260 includes a first inflection point 261 that occurs at a local temperature maxima 262, and has an associated first electric power level 263. The non-linear power-temperature relationship 260 also includes a second inflection point 265 that occurs at a local temperature minima 266, and has an associated second electric power level 267.

The non-linear power-temperature relationship 260 also includes a third operating point 268 and associated third electric power level 269, which occurs at a point on the non-linear power-temperature relationship 260 at a power level that is greater than the second electric power level 267 wherein the temperature is equal to the local temperature maxima 262.

The non-linear power-temperature relationship 260 may be separated into a first operating region 270, a second operating region 280, and a third operating region 290. The first operating region 270 is defined as a region of the non-linear power-temperature relationship 260 between a zero power output 202 and the first electric power level 263. The second operating region 280 is defined as a region of the non-linear power-temperature relationship 260 between the first electric power level 263 and the third electric power level 269. The third operating region 290 is defined as a region of the non-linear power-temperature relationship 260 wherein the power output is greater than the third electric power level 269. A first operating point 275 (A) is indicated, and represents a power level that is within the first operating region 270, i.e., less than the first electric power level 263 of the fuel cell power device 20'. A second operating point 285 (B) is also indicated, and represents a power level that is within the second operating region 280, i.e., greater than the first electric power level 263 and less than the third electric power level 269.

The performance characterization 250 for the embodiment of the fuel cell power device 20' differs from the performance characterization 200 for the embodiment of the fuel cell power device 20 that is described with reference to FIG. 2A in that the power levels and temperatures associated with the maxima and minima points differ. This may lead to differences in control related to the power demands and utilizations for the fuel cell power device 20 and the fuel cell power device 20'.

In one embodiment, the performance characterization 250 represents a characterization of an embodiment of the fuel cell power device 20 after an in-use period of operation.

In one embodiment, the performance characterization 250 represents a characterization of another configuration of the fuel cell power device 20' after an in-use period of operation.

Figure 2C:
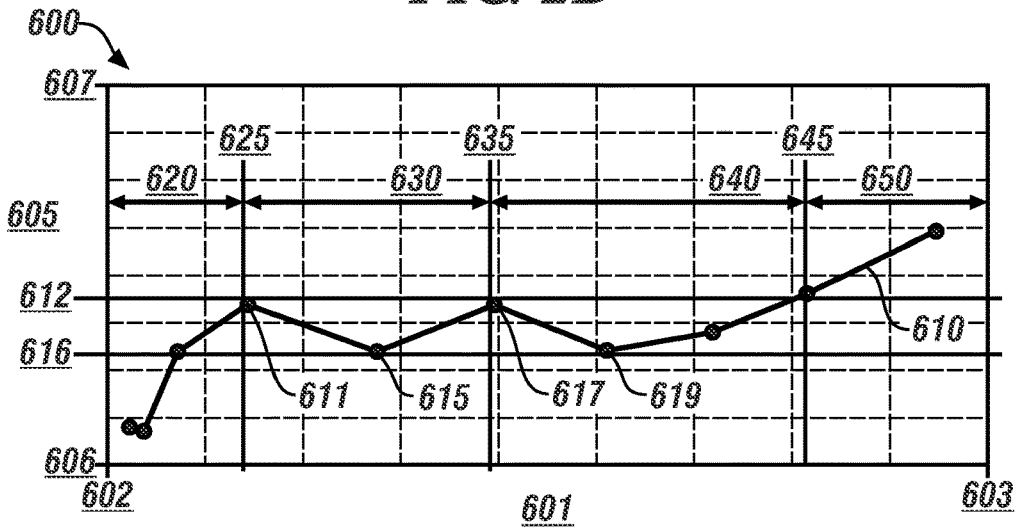
FIG. 2C graphically illustrates an embodiment of a non-linear power-temperature relationship for an embodiment of a fuel cell power device that has multiple local temperature maximas and multiple local temperature minimas, in accordance with the disclosure.

FIG. 2C graphically illustrates another performance characterization 600 for an embodiment of the fuel cell power device 20' that is described with reference to FIG. 1. The performance characterization 600 includes a non-linear power-temperature relationship 610 that has multiple local temperature maximas and multiple local temperature minimas. The performance characterization 600 may be described in relation to electric power 601 on the horizontal axis and a temperature 605 of the fuel cell power device 20' on the vertical axis, with a non-linear power-temperature relationship 610 being illustrated. The electric power 601 ranges between a minimum or zero power output 602 and a maximum power output 603. The temperature 605 ranges between a low temperature 606, e.g., ambient temperature, and a maximum temperature 607, such as may occur when the fuel cell power device 20 is operating at maximum power output.

The non-linear power-temperature relationship 610 for the fuel cell power device 20' may occur as a result of system optimization, material selection, design trade-offs, etc. during product development that affect performance, durability, and robustness to achieve electric power targets.

The non-linear power-temperature relationship 610 includes a first maxima point 611 that occurs at a local temperature maxima 612, and has an associated first electric power level 625. The non-linear power-temperature relationship 610 also includes a first minima point 615 that occurs at a local temperature minima 616, and has an associated second electric power level. The non-linear power-temperature relationship 610 includes a second maxima 617 that occurs at the local temperature maxima 612, and has an associated second electric power level 635. The non-linear power-temperature relationship 610 also includes a second minima 619 that occurs at the local temperature minima 616, and has an associated second electric power level. The non-linear power-temperature relationship 610 also includes a third operating point and associated third electric power level 645 that occur at a point on the non-linear power-temperature relationship 610 at a power level wherein the temperature is equal to the local temperature maxima 612.

The non-linear power-temperature relationship 610 may be separated into a first operating region 620, a second operating region 630, a third operating region 640, and a fourth operating region 650. The first operating region 620 is defined as a region of the non-linear power-temperature relationship 610 between a zero power output 602 and the first electric power level 625. The second operating region 630 is defined as a region of the non-linear power-temperature relationship 610 between the first electric power level 625 and the second electric power level 635. The third operating region 640 is defined as a region of the non-linear power-temperature relationship 610 wherein the power output is between the second electric power level 635 and the third electric power level 645. The fourth operating region 650 is defined as a region of the non-linear power-temperature relationship 610 wherein the power output is greater than the third electric power level 645.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of a high-speed clock and memory/storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at periodic intervals during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter may have a discrete value, e.g., either "1" or "0", or may be infinitely variable in value.

FIG. 3 schematically illustrates an embodiment of the fuel cell temperature management routine ('control routine') 300 for monitoring and controlling operation of one or the array 22 of fuel cell power device(s) 20 that are employed in an embodiment of the torque generating system 100 with the high-voltage battery 10 described with reference to FIG. 1. When the array 22 of the fuel cell power devices 20 is employed, one or more of the fuel cell power device(s) 20 may have a performance characterization 200 such as described with reference to FIG. 2A, one or more of the fuel cell power devices may have a performance characterization 250 such as described with reference to FIG. 2B, and/or one or more of the fuel cell power devices may have a performance characterization 600 such as described with reference to FIG. 2C. The control routine 300 takes into consideration one or more of the non-linear power-temperature relationships 210, 260, and/or 610 associated with the respective performance characterizations 200, 250, and/or 600 that are described with reference to FIGS. 2A, 2B, and/or 2C, respectively, for respective embodiment(s) of the fuel cell power device(s) 20, 20'. In one embodiment, and as described herein, the control routine 300 describes operation of the torque generating system 100 including the fuel cell power device(s) 20 and electric drive unit 50 when deployed on-vehicle. The control routine 300 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. Table 1 is provided as a key wherein the numerically labeled blocks and the corresponding functions are set forth as follows, corresponding to the control routine 300.

TABLE 1

| BLOCK | BLOCK CONTENTS |
|---|---|
| 301 | Operator parameters |
| 302 | Vehicle parameters |
| 303 | HV battery parameters |
| 304 | Electric drive unit parameters |
| 305 | Navigation/Route parameters |
| 306 | Fuel Cell characterization |
| 310 | Monitor Parameters |
| 312 | Is power request within permissible range? |
| 314 | Execute normal operation |
| 315 | Execute fuel cell temperature management operation |
| 320 | Single fuel cell operation |
| 321 | Determine power request |
| 322 | Determine power contributions from high-voltage battery, fuel cell |
| 323 | Select first and second fuel cell operating points to achieve an average fuel cell power |
| 324 | Control operation of the fuel cell to alternate between first and second fuel cell operating points |
| 325 | Supplement with electric power from HV battery to meet power request |
| 330 | Dual fuel cell operation |
| 331 | Determine power request |
| 332 | Determine power contributions from high-voltage battery, first and second fuel cells |
| 333 | Select first and second fuel cell operating points from first and second fuel cells to achieve an average fuel cell power |
| 334 | Control operation of the first and second fuel cells to generate electric power |
| 335 | Supplement with electric power from HV battery to meet power request |

Execution of the process 300 may proceed as follows. The steps of the process 300 may be executed in a suitable order, and are not limited to the order described with reference to FIG. 3. As employed herein, the term "1" indicates an answer in the affirmative, or "YES", and the term "0" indicates an answer in the negative, or "NO".

The control routine 300 takes into account a plurality of parameters, including operator parameters 301; vehicle parameters 302; high-voltage battery parameters 303; electric drive unit parameters 304; navigation/route parameters 305; and fuel cell power device parameters 306, such as the performance characterization 200 of the fuel cell power device(s) 20, 20' described with reference to FIG. 2A. Alternatively, one or more of the fuel cell power device(s) 20 may have the performance characterization 260 that is described with reference to FIG. 2B. Alternatively, one or more of the fuel cell power device(s) 20, 20' may have the performance characterization 600 that is described with reference to FIG. 2C.

The operator parameters 301 are determined based upon operator inputs to various control devices, and include a power request in the form of an operator request for torque or acceleration, or an operator braking request. Other secondary operator requests that may affect vehicle power include, by way of non-limiting examples, operator requests for heating, ventilation and air conditioning; operator requests for lighting, etc., which may be part of the auxiliary power unit 60. The operator parameters 301 are employed to determine the power request, including, e.g., a power request for vehicle acceleration, a power request for vehicle braking, and a power request for mechanical torque.

The vehicle parameters 302 are determined based upon vehicle operation, and include, by way of non-limiting examples, vehicle speed, road load including inclines and declines, vehicle payload, ambient temperature, accessory power, etc.

The high-voltage battery parameters (HV battery parameters) 303 include, by way of non-limiting examples, state of charge (SOC), charge/discharge power, temperature, minimum and maximum SOC limits, minimum and maximum charging and discharging limits, etc., for the high-voltage battery 10.

The electric drive unit parameters 304 include continuous and maximum power limits and ranges for the electric drive unit 50.

The navigation/route parameters 305 include parameters related to traffic and travel route planning, such as city/highway/urban, uphill/downhill, etc., as determined for an intended travel route. Route parameters may use inputs via the propulsion system learning software, drive push button input, etc.

The fuel cell power device parameters (fuel cell characterization) 306 include the performance characterization(s) 200 of the fuel cell power device(s) 20 that are described with reference to FIG. 2, and other parameters related to power states, power/time states, minimum and maximum voltage limits, voltage cycles, temperature(s), etc.

The control routine 300 monitors and evaluates the plurality of parameters, including operator parameters 301, vehicle parameters 302, high-voltage battery parameters 303, electric drive unit parameters 304, navigation/route parameters 305, and fuel cell power device parameters 306 (Step 310).

The evaluation of the plurality of parameters includes determining whether the power request is within a permissible range for executing the control routine 300 (312). The power request is within the permissible range for executing the control routine 300 when a power demand for electric power output from the fuel cell(s) 20 is within a range that will enable low temperature operation of the fuel cell(s) 20.

The determination that the electric power output from the fuel cell(s) 20 is within a range that will enable low temperature operation of the fuel cell(s) 20 is system-specific, and takes into consideration a maximum torque capability of the electric drive unit 50, the electric power capability of the high-voltage battery 10, the electric power capability(ies) of the fuel cell(s) 20, and the non-linear power-temperature relationship(s) 210 of the fuel cell(s) 20. This information may be predetermined during development, and calibrated and stored in and retrieved from a memory device of the controller 70. This information may also be updated over life via an equation set, downloaded via an interface plug during service, or via conductivity means such as satellite, etc.

When the power request is outside the permissible range for executing the control routine 300 (312)(0), normal operation of the torque generating system 100 is commanded (314).

When the power request is within the permissible range for executing the control routine 300 (312)(1), operation of the torque generating system 100 is commanded to execute fuel cell temperature management to advantageously employ the applicable non-linear power-temperature relationship 210, 260, 600 of the fuel cell(s) 20, 20' to manage the temperature(s) of the fuel cell(s) 20, 20'.

The control routine 300 uses optimization software to understand and control the torque generating system 100 to meet the power request while executing the fuel cell temperature management operation. This includes balancing the vehicle parameters 302, high-voltage battery parameters 303, electric drive unit parameters 304, navigation/route parameters 305 and fuel cell power device parameters 306 and controlling operation of the torque generating system 100 to be responsive to the operator parameters 301 for acceleration and/or braking, etc. (Step 315).

As described with reference to FIG. 2A, the fuel cell power device 20 has a non-linear power-temperature relationship 210 that has a local temperature maxima 212 that occurs at a first electric power level 213 and a local temperature minima 216 that occurs at a second electric power level 217. A first operating point 225 that is less than the first electric power level 213 of the fuel cell power device 20 is selected, and a second operating point 235 that is greater than the first electric power level 213 and less than the third electric power level 219 is selected. The first and second operating points 225, 235 are selected to achieve an average electric power level from an embodiment of the fuel cell power device 20 having the non-linear power-temperature relationship 210, and are responsive to the power request when taking into account electric power available from the high-voltage battery 10. The purpose of this operation to control the average electric power level generated by the fuel cell power device(s) 20 by cyclically controlling the first and second operating points 225, 235 is to achieve a reduction in the operational temperature of the fuel cell power device(s) 20, thus providing operating conditions that improve service life when compared to operation at higher operational temperatures. The first and second operating points 225, 235 are selected so the cyclical control of the fuel cell power device(s) 20 achieves an average power over time that is responsive to the power request. The first and second operating points 225, 235 are low power and mid-range power levels, respectively, for the non-linear power-temperature relationship 210 in one embodiment, wherein the low power and mid-range power levels are defined and described in context of a maximum power output of the electric drive unit 50. It is appreciated that the foregoing description includes, in the alternative, employing the first and second operating points 275, 285 for the non-linear power-temperature relationship 260 that is described with reference to FIG. 2B. It is appreciated that the foregoing description includes, in the alternative, employing selected operating points for the non-linear power-temperature relationship 600 that is described with reference to FIG. 2C.

Referring again to FIG. 3, when the torque generating system 100 includes a single fuel cell power device 20 (Step 320), the process includes determining the power request (step 321), and determining expected electric power contributions from the high-voltage battery 10 and the fuel cell 20 that are delivered to the electric drive unit 50 for tractive effort (Step 322). First and second operating points 225, 235 for the fuel cell power device 20 are selected to achieve an average electric power level from the fuel cell power device 20 that is responsive to the power request, taking into account electric power available from the high-voltage battery 10 (Step 323). Operation of the fuel cell power device 20 is controlled to alternate between the first and second operating points 225, 235 (Step 324) and supplemental electric power is supplied from the high-voltage battery 10 to meet the power request (Step 325).

Operation of the fuel cell power device 20 may take the form of generating positive tractive torque that is responsive to an operator request for acceleration, or generating negative tractive torque that is responsive to an operator request for braking. This control may take the form of generating electric power for charging the high-voltage battery 10.

Figure 4A:
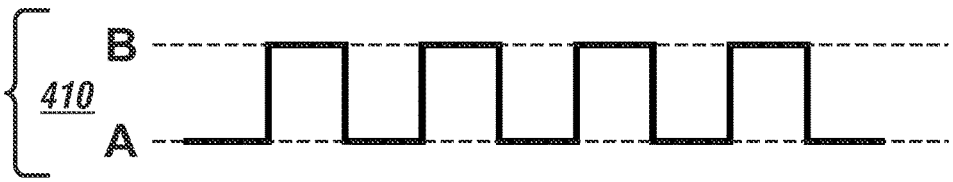
FIG. 4A graphically illustrates operation of an embodiment of the torque generating system that includes a single fuel cell power device, in accordance with the disclosure.

Operation of the fuel cell power device 20 may include cyclically alternating the electric power output from the fuel cell power device 20 between a first operating point (A) and a second operating point (B) to transfer electric power to the electric drive unit 50 of the torque generating system 100 for mechanical torque generation that is responsive to the power request. For purposes of illustration, the first operating point (A) corresponds to the operating point 225 that is described with reference to FIG. 2, and the second operating point (B) corresponds to the second operating point 235 that is described with reference to FIG. 2. This operation may include cyclically alternating the electric power output from the fuel cell power device 20 between the first operating point (A) and the second operating point (B) at a pulsewidth-modulated duty cycle (PWM-DC) having a frequency and a duty cycle that is responsive to the power request. The frequency may be a fixed frequency, or alternatively, a variable frequency. The fuel cell power device 20 is cyclically controlled at one of the first operating point (A) and the second operating point (B) to achieve an average power over time that achieves an average operating temperature of the fuel cell power device 20 that is less than a target operating temperature. One example of operation that includes cyclically alternating the electric power output from the fuel cell power device 20 (FCP) between the first operating point (A) and the second operating point (B) is graphically illustrated with reference to square wave 410 of FIG. 4A.

When the torque generating system 100 includes the array 22 of the fuel cell power devices 20, the process includes as follows (Step 330). It is appreciated that when the array 22 of the fuel cell power devices 20 is employed, one or more of the fuel cell power device(s) 20 may have a performance characterization 200 such as described with reference to FIG. 2A, one or more of the fuel cell power devices may have a performance characterization 250 such as described with reference to FIG. 2B, and/or one or more of the fuel cell power devices may have a performance characterization 600 such as described with reference to FIG. 2C. The power request is determined (step 331), and expected electric power contributions from the high-voltage battery 10 and the array 22 of fuel cells 20 that are delivered to the electric drive unit 50 for tractive effort are also determined (Step 332). First and second operating points 225, 235 for each of the array 22 of fuel cell power devices 20 are selected to achieve an average electric power level from all of the fuel cell power devices 20 that is responsive to the power request, taking into account electric power available from the high-voltage battery 10 (Step 333).

Operations of the array 22 of fuel cell power devices 20 are controlled (Step 334) and supplemental electric power is supplied from the high-voltage battery 10 to meet the power request (Step 335). This may include, for example, transferring electric power from the array 22 of fuel cell power devices 20 and the high-voltage battery 10 to the electric drive unit 50. This may include, for example, transferring electric power from the array 22 of fuel cell power devices 20 to the electric drive unit 50 without power from the high-voltage battery 10. This may include, for example, transferring electric power from the high-voltage battery 10 to the electric drive unit 50, with the array 22 of fuel cell power devices 20 being deactivated. This may include, for example, transferring electric power from the electric drive unit 50 and the array 22 of fuel cell power devices 20 to the high-voltage battery 10. This may include, for example, transferring electric power from the electric drive unit 50 to the high-voltage battery 10, with the array 22 of fuel cell power devices 20 being deactivated.

Operation of the array 22 of the fuel cell power devices 20 is controlled to generate positive tractive torque that is responsive to an operator request for acceleration, or generate negative tractive torque that is responsive to an operator request for braking. This control may take the form of generating electric power for charging the high-voltage battery 10. During this period, energy from the fuel cell power device 20 is transferred to the high-voltage battery.

Operating the control routine 300 may include having different amplitudes, frequencies, and duty cycles for the first operating point (A) and the second operating point (B) to best balance overall optimization. The optimization may or may not follow instantaneous values of the power request.

Operation of the fuel cell power devices 20 may include cyclically alternating the electric power output from each of the fuel cell power devices 20 between the first operating point (A) and the second operating point (B) to transfer electric power to the electric drive unit 50 of the torque generating system 100 for mechanical torque generation that is responsive to the power request, with PWM commands that have a frequency and a duty cycle that are responsive to the power request. For purposes of illustration, the first operating point (A) corresponds to the operating point 225 that is described with reference to FIG. 2, and the second operating point (B) corresponds to the second operating point 235 that is described with reference to FIG. 2.

The frequency of the PWM command may be a fixed frequency, or alternatively, a variable frequency. The fuel cell power devices 20 are cyclically controlled between the first operating point (A) and the second operating point (B) to achieve an average power over time that achieves an average operating temperature of the fuel cell power device 20 that is less than a target operating temperature.

Figure 4B:
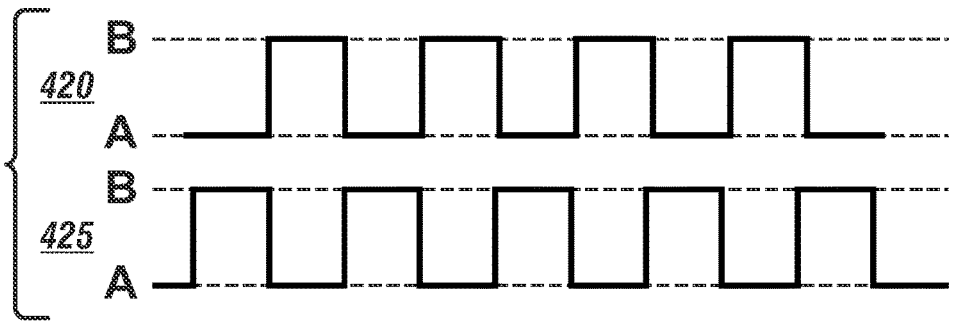
FIGS. 4B-4G graphically illustrate operations of an embodiment of the torque generating system that includes dual fuel cell power devices, in accordance with the disclosure.

One example of operation that includes cyclically alternating the electric power output from a first fuel cell power device 20 and a second fuel cell power device 20 between the first operating point 225 (A) and the second operating point (B) is graphically illustrated with reference to first and second PWM commands 420, 425, respectively, of FIG. 4B. In this example, the first and second fuel cell power devices 20 are controlled to cyclically alternate between the first operating point (A) and the second operating point (B) to transfer electric power to the electric drive unit 50 of the torque generating system 100, with the first and second PWM commands 420, 425, respectively, operating at the same frequency and with a phase difference between the first PWM command 420 and the second PWM command 425 being 180 degrees.

Figure 4C:
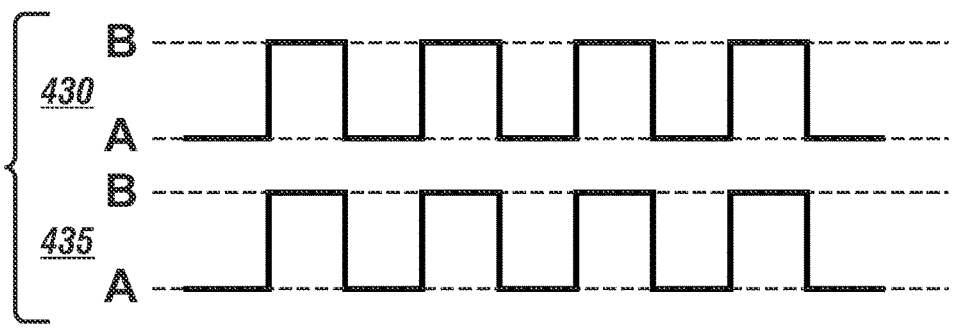

Another example of operation that includes cyclically alternating the electric power output from a first fuel cell power device 20 and a second fuel cell power device 20 between the first operating point 225 (A) and the second operating point (B) is graphically illustrated with reference to first and second PWM commands 430, 435, respectively, of FIG. 4C. In this example, the first and second fuel cell power devices 20 are controlled to cyclically alternate between the first operating point (A) and the second operating point (B) to transfer electric power to the electric drive unit 50 of the torque generating system 100, with the first and second PWM commands 430, 435, respectively, operating at the same frequency and in phase.

Figure 4D:
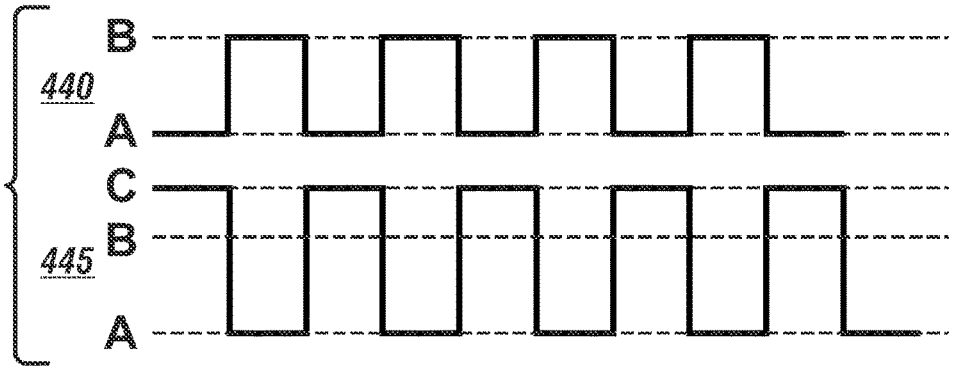

Another example of operation that includes cyclically alternating the electric power output from a first fuel cell power device 20 and a second fuel cell power device 20 between the first operating point (A) and a third operating point (C) is graphically illustrated with reference to first and second PWM commands 440, 445, respectively, of FIG. 4D. In this example, the first and second fuel cell power devices 20 are controlled to cyclically alternate between the first operating point (A) and the third operating point (C) to transfer electric power to the electric drive unit 50 of the torque generating system 100, with the first and second PWM commands 440, 445, respectively, operating at the same frequency and 180 degrees out of phase. In this embodiment, the magnitude of the third operating point (C) is greater than the magnitude of the second operating point (B).

Figure 4E:
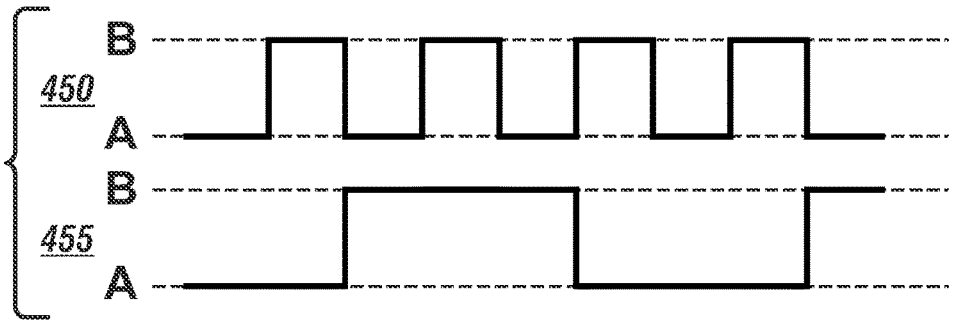

Another example of operation that includes cyclically alternating the electric power output from a first fuel cell power device 20 and a second fuel cell power device 20 between the first operating point (A) and the second operating point (B) is graphically illustrated with reference to first and second PWM commands 450, 455, respectively, of FIG. 4E. In this example, the first and second fuel cell power devices 20 are controlled to cyclically alternate between the first operating point (A) and the second operating point (B) to transfer electric power to the electric drive unit 50 of the torque generating system 100, with the first PWM command 450 operating at a first frequency that differs from a second frequency of the second PWM command 455.

Figure 4F:
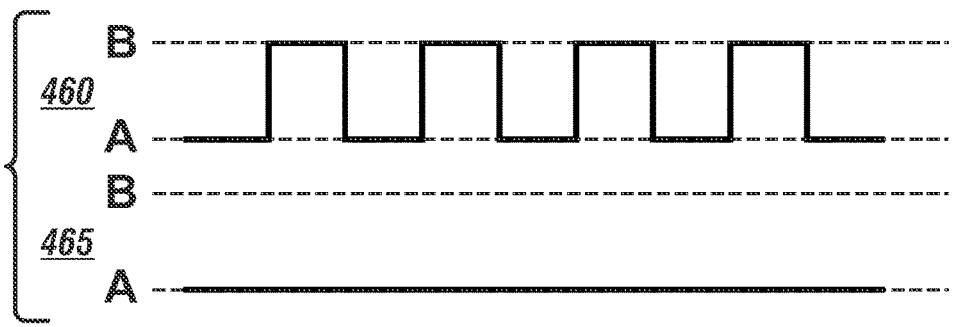

Another example of operation that includes cyclically alternating the electric power output from a first fuel cell power device 20 and a second fuel cell power device 20 between the first operating point (A) and the second operating point (B) is graphically illustrated with reference to first and second PWM commands 460, 465, respectively, of FIG. 4F. In this example, the first fuel cell power device 20 is controlled to cyclically alternate between the first operating point (A) and the second operating point (B) to transfer electric power to the electric drive unit 50 of the torque generating system 100, and the second fuel cell power device operating continuously at the first operating point (A). In one embodiment, the second fuel cell power device is deactivated when controlled to the first operating point (A), which allows cooling of the second fuel cell power device 20 to occur.

Figure 4G:
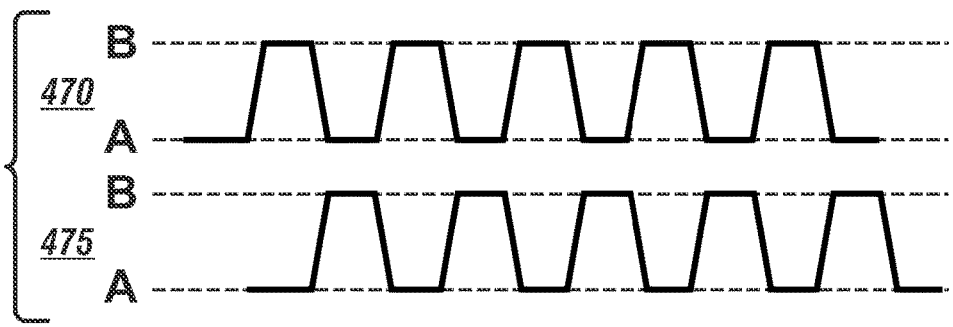

Another example of operation that includes cyclically alternating the electric power output from a first fuel cell power device 20 and a second fuel cell power device 20 between the first operating point (A) and the second operating point (B) is graphically illustrated with reference to first and second commands 470, 475, respectively, of FIG. 4G. In this example, the first and second commands 470, 475, respectively, provide a ramped transition between the first operating point (A) and the second operating point (B), i.e., a time-rate change therebetween.

Figure 5:
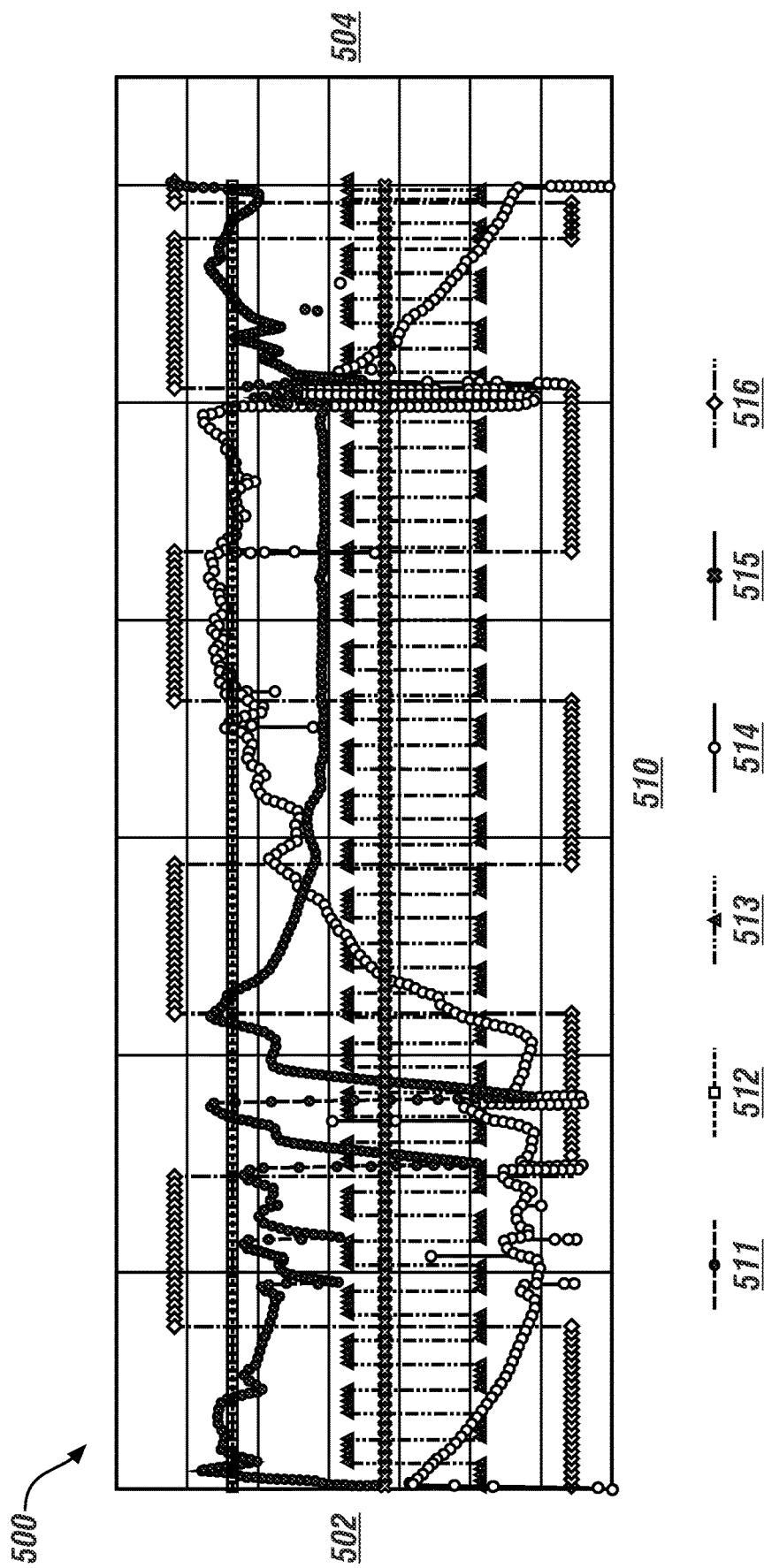
FIG. 5 graphically illustrates temperature and power data associated with operation of an embodiment of a torque generating system that employs an embodiment of a fuel cell temperature management routine, in accordance with the disclosure.

FIG. 5 graphically illustrates operation of an embodiment of the fuel cell power device 20, with temperature 502 and power 504 plotted in relation to time 510. Other parameters include inlet temperature 511 and total power 514. The operating conditions include a continuous operating condition (515) and a cyclical operating condition (516), wherein the cyclical operating condition (516) employs the control concepts described herein. Resultant data includes fuel cell temperature under the continuous operating condition (512) and fuel cell temperature under the cyclical operating condition (513). The results indicate that the fuel cell temperature under the cyclical operating condition (513) is less than the fuel cell temperature under the continuous operating condition (512) for the same average power output.

The concepts described herein provide a system and associated control strategy for operating an embodiment of the torque generating system 100 to meet performance requirements while actively controlling temperature(s) of the fuel cell(s) 20, which may improve the service life thereof. This includes power cycling management based upon characteristic power/temperature relationship(s) of the fuel cell(s) 20.

Exemplary embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with mechanical and/or electronic systems, and that the vehicle systems described herein are merely exemplary embodiment of possible implementations. It should be noted that many alternative or additional functional relationships or physical connections may be present in one or more embodiments.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A torque generating system comprising:
    a fuel cell power device;
    a high-voltage battery;
    an electric drive unit on a mobile platform;
    an auxiliary power unit configured for responding to an operator request for at least one of lighting, heating, ventilation, and air conditioning to the mobile platform;
    a high-voltage electric power distribution system; and
    a controller;
    wherein the fuel cell power device and the high-voltage battery are electrically connected to a high-voltage bus, and wherein electric power is supplied to the electric drive unit via the high-voltage bus;
    wherein the high-voltage power distribution system and the high-voltage battery are electrically connected to the high-voltage bus, and wherein electrical energy is supplied to the auxiliary power unit via the high-voltage power distribution system;
    wherein the fuel cell power device has a non-linear power-temperature relationship that has a local temperature maxima at a first electric power level and a local temperature minima at a second electric power level;
    wherein a first operating point of the fuel cell power device is less than the first electric power level;
    wherein a second operating point of the fuel cell power device is greater than the first electric power level and less than a third electric power level, wherein the third electric power level corresponds to operation of the fuel cell power device that generates a fuel cell temperature that is less than the local temperature maxima;
    wherein the fuel cell power device is controlled to one of the first operating point or the second operating point to transfer electric power to the electric drive unit; and
    wherein the high-voltage battery and the fuel cell power device cooperate to transfer electric power to the electric drive unit to generate mechanical torque that is responsive to a power request.

2. The torque generating system of claim 1, wherein the second operating point of the fuel cell power device corresponds to the second electric power level that is associated with the local temperature minima.

3. The torque generating system of claim 1, wherein the electric drive unit comprises an electric machine that is coupled to a vehicle driveline; and wherein the high-voltage battery and the fuel cell power device cooperate to transfer electric power to the electric machine to generate tractive torque that is responsive to the power request.

4. The torque generating system of claim 3, wherein the high-voltage battery and the fuel cell power device cooperate to transfer electric power to the electric machine to generate positive tractive torque that is responsive to the power request, wherein the power request includes a request for vehicle acceleration.

5. The torque generating system of claim 3, wherein the high-voltage battery and the fuel cell power device cooperate to react torque to generate electric power through the electric machine to generate negative tractive torque that is responsive to the power request, wherein the power request includes a request for braking.

6. The torque generating system of claim 1, wherein the electric drive unit comprises an electric machine that is coupled to a stationary electric motor; and wherein the high-voltage battery and the fuel cell power device cooperate to transfer electric power to the electric machine to generate mechanical torque that is responsive to the power request.

7. The torque generating system of claim 1, wherein the fuel cell power device being controlled to one of the first operating point or the second operating point to transfer electric power to the electric drive unit comprises the fuel cell power device being controlled to cyclically alternate between the first operating point and the second operating point to transfer electric power to the electric drive unit of the torque generating system to generate mechanical torque that is responsive to the power request.

8. The torque generating system of claim 7, wherein the fuel cell power device being controlled to cyclically alternate between the first operating point and the second operating point comprises the fuel cell power device being controlled to alternate between the first operating point and the second operating point at a frequency and a duty cycle that is responsive to the power request.

9. The torque generating system of claim 7, wherein the fuel cell power device is cyclically controlled between the first operating point and the second operating point to achieve an average power over time that achieves an average operating temperature of the fuel cell power device that is less than a target operating temperature.

10. The torque generating system of claim 1, further comprising the fuel cell power device being controlled to transfer electric power to charge the high-voltage electric battery.

11. A torque generating system comprising:
a first fuel cell power device;
a second fuel cell power device;
a high-voltage battery;
an electric drive unit on a mobile platform;
an auxiliary power unit configured for responding to an operator request for at least one of lighting, heating, ventilation, and air conditioning to the mobile platform;
a high-voltage electric power distribution system; and
a controller;
wherein the first and second fuel cell power devices and the high-voltage battery are electrically connected to a high-voltage bus, and wherein electric power is supplied to the electric drive unit via the high-voltage bus;
wherein the high-voltage power distribution system and the high-voltage battery are electrically connected to the high-voltage bus, and wherein electrical energy is supplied to the auxiliary power unit via the high-voltage power distribution system;
wherein each of the first and second fuel cell power devices has a non-linear power-temperature relationship that has a local temperature maxima at a first electric power level and a local temperature minima at a second electric power level;
wherein a first operating point of each of the first and second fuel cell power devices is less than the first electric power level, and wherein a second operating point of each of the fuel cell power devices is greater than the first electric power level and occurs at a third electric power level, wherein the third electric power level corresponds to operation of the fuel cell power device that generates a fuel cell temperature that is less than the local temperature maxima;
wherein the first fuel cell power device is controlled to one of the first operating point or the second operating point to transfer electric power to the electric drive unit;
wherein the second fuel cell power device is controlled to one of the first operating point or the second operating point to transfer electric power to the electric drive unit; and
wherein the high-voltage battery and the first and second fuel cell power devices cooperate to transfer electric power to the electric drive unit to generate mechanical torque that is responsive to a power request.

12. The torque generating system of claim 11, comprising the first fuel cell power device being controlled to the second operating point coincident with the second fuel cell power device being controlled to the first operating point to transfer electric power to the electric drive unit.

13. The torque generating system of claim 11, comprising the first fuel cell power device being controlled to one of the first operating point or the second operating point, and the second fuel cell power device being deactivated.

14. The torque generating system of claim 10, wherein the first and second fuel cell power devices being controlled to one of the first operating point or the second operating point to transfer electric power to the electric drive unit comprises the first and second fuel cell power devices being controlled to cyclically alternate between the first operating point and the second operating point to transfer electric power to the electric drive unit of the torque generating system to generate mechanical torque that is responsive to the power request.

15. The torque generating system of claim 14, wherein the first and second fuel cell power devices being controlled to cyclically alternate between the first operating point and the second operating point comprises the first fuel cell power device being controlled to alternate between the first operating point and the second operating point at a first frequency and a first duty cycle, and the second fuel cell power device being controlled to alternate between the first operating point and the second operating point at a second frequency and a second duty cycle.

16. The torque generating system of claim 15, wherein the first frequency is equal to the second frequency; and wherein a phase difference between the first frequency and the second frequency is 180 degrees.

17. The torque generating system of claim 15, wherein the first frequency is equal to the second frequency; and wherein the first frequency and the second frequency are in phase.

18. The torque generating system of claim 15, wherein the first frequency differs from the second frequency.

* * * * *